United States Patent
Sandner et al.

(10) Patent No.: US 7,354,458 B2
(45) Date of Patent: Apr. 8, 2008

(54) PREPARATIONS BASED ON WATER AND/OR ORGANIC SOLVENTS AND THEIR USE AS A FINISH ON FLAT MATERIALS

(75) Inventors: Bernhard Sandner, Geretsried (DE); Alfred Wilfling, Geretsried (DE); Gunther Duschek, Benediktbeuren (DE)

(73) Assignee: Rudolf GmbH & Co., KG, Chemische Fabrik, Geretsried (DE)

( * ) Notice: Subject to any disclaimer, the term of this patent is extended or adjusted under 35 U.S.C. 154(b) by 0 days.

(21) Appl. No.: 10/939,337

(22) Filed: Sep. 14, 2004

(65) Prior Publication Data

US 2005/0085573 A1  Apr. 21, 2005

Related U.S. Application Data

(63) Continuation of application No. PCT/EP03/02639, filed on Mar. 13, 2003.

(30) Foreign Application Priority Data

Mar. 15, 2002  (DE) .................. 102 11 549

(51) Int. Cl.
*D06M 13/395* (2006.01)
(52) U.S. Cl. .............. 8/115.6; 252/8.62; 528/44; 528/45
(58) Field of Classification Search .......... 8/115.51, 8/115.6; 252/8.62; 528/44, 45
See application file for complete search history.

(56) References Cited

U.S. PATENT DOCUMENTS

| | | | |
|---|---|---|---|
| 2,927,090 A | 3/1960 | Hiestand et al. | |
| 5,164,252 A | * 11/1992 | Henning et al. | 442/80 |
| 6,080,830 A | 6/2000 | Dirschl et al. | |

FOREIGN PATENT DOCUMENTS

| | | | |
|---|---|---|---|
| DE | 1 001 965 | | 2/1957 |
| DE | 1 017 133 | | 10/1957 |
| DE | 44 41 448 A1 | | 5/1996 |
| DE | 100 17 651 A1 | | 10/2001 |
| EP | 0 314 944 A2 | | 10/1988 |
| EP | 0 314 944 A3 | | 10/1988 |
| EP | 0 314 944 B1 | | 10/1988 |
| EP | 0 429 983 A1 | | 11/1990 |
| EP | 0 159 117 B1 | | 1/1993 |
| EP | 0 325 918 B1 | | 1/1998 |
| EP | 0 872 503 A1 | | 3/1998 |
| JP | 59-009271 | * | 1/1984 |
| JP | 59009271 | * | 1/1984 |
| WO | 99/14422 | | 3/1999 |
| WO | 00/29663 | | 5/2000 |

* cited by examiner

*Primary Examiner*—Lorna M. Douyon
*Assistant Examiner*—Amina Khan
(74) *Attorney, Agent, or Firm*—Buchanan Ingersoll & Rooney PC

(57) ABSTRACT

A composition based on water and/or organic solvents and their use as a finish on flat materials, comprising

| (1) | 10-90% | of a hydrophobic wax based component, |
|---|---|---|
| (2) | 10-90% | of a hydrophobic reaction product prepared by reacting a component (A) with a partially blocked or non-blocked di-, tri- or polyisocyanate and |
| (3) | 0-45% | by weight of a blocked or non-blocked di-, tri- or polyisocyanate and |
| (4) | | optionally, an emulsifier. |

When used as a finish on flat materials, the composition can endow the treated flat materials with durable hydrophobic properties.

9 Claims, No Drawings

PREPARATIONS BASED ON WATER AND/OR ORGANIC SOLVENTS AND THEIR USE AS A FINISH ON FLAT MATERIALS

CROSS REFERENCE TO RELATED APPLICATIONS

This application claims priority under 35 U.S.C. §119 to German Application 102 11 549.4 filed in Germany on 15 Mar. 2002, and as a continuation application under 35 U.S.C. §120 to PCT/EP03/02639 filed as an International Application on 13 Mar. 2003 designating the U.S., the entire contents of which are hereby incorporated by reference in their entireties.

BACKGROUND

The invention relates to preparations based on water and/or organic solvents and their use as a finish on flat materials.

It is known that flat materials are finished using water-based or solvent-based preparations of silicone oils, paraffins, fluorocarbon (FC) polymers and other additives that endow the finished flat material with particular hydrophobic effects in order that the flat material may in use be able to meet the challenge of exposures to rain, splashed water or moisture from other sources. Tent fabrics, for instance, are treated with aqueous emulsions of paraffins, metal soaps and also silicic acid salts of polyvalent metals in order that the textile surface may be rendered impervious to rain or splashed water. Preparations of this kind are also used for treating paper, again in order to improve the hydrophobic properties. German Auslegesschrift DE-AS 1001965 discloses using reaction products of basic metal salts of high molecular weight fatty acids or resin acids and low molecular weight di- or polyisocyanates to be applied onto textiles from organic solvents.

Common to all these known uses is that, after their treatment with the chemicals mentioned, the flat materials cannot be washed or subjected to other cleaning measures to remove any soiling. However, where the substrate is such that cleaning operations cannot be avoided, a dramatic deterioration in the water-repellent properties is observed. This disadvantage can to some extent be compensated by refreshing the hydrophobicity by aftertreatment with suitable hydrophobicizing agents, in which case the chemicals employed will usually have the same or similar chemical bases as the initial finish.

State of the art wovens are widely used in sports and leisure wear, but also for articles in the military or firefighting sector or for other protective clothing. Articles of this kind soil very quickly, especially when intensively used, and therefore are subjected to frequent washing. Washing is typically accomplished using laundry detergents in industrial or household washing machines or by a hand wash. In all washing operations, the flat material is not only wetted by the detergents used but also subjected to a more or less severe mechanical stress due to flexing, wringing and compressing. The conjoint action of laundry detergents and mechanical forces cause substantial detachment of the applied finishes from the flat materials and, after drying, the substrates will possess only moderate water repellency if any. Refreshing the hydrophobicity by spraying or application in the washing machine or similar methods of application is not satisfactorily possible with the impregnating products currently on the market, since the achievement of good hydrophobicity would require that the treated sheet, after it has been dried, be heated to above the melting point of the waxes used in order that the wax particles may be caused to coalesce and hence create a continuous, perfectly hydrophobic film of wax.

It is therefore a prerequisite in relation to the articles mentioned that, as well as providing good initial hydrophobicity, the finish should also be durable to multiple washes. Preparations designed to ameliorate the lack of durability to washing operations were therefore developed early on. For instance, DE-B 1 017 133 describes hydrophobicizing agents prepared by mixing a condensation product of hexamethylolmelamine hexamethyl ether, stearic acid, stearic acid diglyceride and triethanolamine with paraffin. The resulting products are flaky or lumpy and are converted before use into an emulsion form which is appliable from aqueous liquors by melting with hot water or steam and adding acetic acid.

However, the flat materials and fibrous materials endowed therewith have been observed to suffer a distinct harshening of their hand characteristics due to the relatively high add-on, the chemical character of the preparation and especially due to the crosslinking of the fatty acid modified methyloltriazine compound with itself and with the functional groups of natural-based substrates. True, by virtue of this type of reaction, cellulosic substrates, such as cotton or viscose for example, do possess durability to multiple washes, but on lightweight, textile materials built of synthetic fibres of the kind preferentially used for equipping sports and leisure articles, the fibre morphology and also the substantial absence of functional groups mean that it is impossible for a crosslinking reaction to take place to the same extent as in the case of cellulosic articles, which is why the wash durabilities are insufficient. In addition, the harshening is felt to be unnatural and therefore thus finished textiles lack consumer acceptance.

A further, significant disadvantage of the finish described has come to light with the use of these products in commercial practice in that the preparations have to be made at the finisher's from the anhydrous, 100% melt only immediately before use. This is necessary because, owing to the high reactivity of the methylolaminotriazine compound in the aqueous emulsions having high acetic acid contents, a crosslinking reaction may take place within the emulsion particle that not only reduces the reactivity with the textile substrate but also leads to cross-links and agglomerations between the emulsion particles and hence to extreme increases in viscosity. This is the same reason why the preparation when stored for a prolonged period in anhydrous flake, block or prill form, i.e. prior to the emulsifying step, will lose its hydrophobic effects and become increasingly difficult if not impossible to emulsify. The aqueous emulsions likewise possess only limited stability and have to be used up rapidly before reactivity has been reduced to an unacceptable level. It is because of this behaviour that there are hitherto no known ageing-resistant emulsions of the composition described, despite the altogether positive wash durability profile.

Another disadvantage with such preparations is the complicated way the emulsion is made from the flakes. Under present day conditions, frequently involving untrained staff, this constitutes an unacceptable safety risk in textile finishing operations. Moreover, the application process inevitably gives rise to emissions of formaldehyde from the methylolaminotriazine compound and of acetic acid which given today's ecological standards can cause difficulties on account of the noncompliance with emission thresholds.

On the state of the art wovens, especially those composed of synthetic materials, the object described can be achieved in a superior manner through the use of water-based or solvent-based FC polymers. For instance, EP 0 325 918 B1 describes preparations which consist of polyurethanes modified with perfluoroaliphatic groups, and which provide good oil and water repellency on textile substrates coupled with good softness and also satisfactory wash durability. EP 314 944-A- recommends formulations of FC polymers with polyethylene and modified polysiloxanes as providing a particularly smooth, soft hand.

WO 00/29663 A2 describes preparations for durable finishing of fibre which contain reaction products of polyisocyanate-functional compounds with silicone-free and/or silicone-containing softeners and, according to the examples, preferably comprises a hydrophilicizing residue.

Owing to the fact that FC formulations provide not only hydrophobic and oleophobic effects which are durable to washing but at the same time also a good fabric hand, such compounds are currently deemed, especially with regard to use on synthetic flat materials, to be suitable products for the goal to be achieved. The disadvantage with preparations based on FC polymers is their relatively high cost, which is due to the synthesis of FC polymer involving numerous steps, some of which are energy intensive. Moreover, recent studies suggest that FC polymers synthesized by electrofluorination may contain a small amount of by-products whose eco-toxicological properties have not as yet been fully investigated. Although such by-products are not present in the market-dominating FC polymers, which are prepared by telomerization, it cannot be ruled out that the public will take an adverse view of FC polymers as a whole. WO 99/14422 A1 describes preparations for treatment of fibrous substrates which, as well as obligatory FC compounds, comprise the condensation product of a polyisocyanate with a diol and an isocyanate-blocking agent. This condensation product is structurally different from component (2) claimed herein.

The altogether good overall performance level of FC polymers notwithstanding, it is to be noted that, after washing operations, there is a marked reduction in the hydrophobic and oleophobic effects due to deorientation of the active FC moieties on the polymer molecules unless a thermal treatment is carried out to effect a reorientation. Consequently, thus treated flat materials require a heat treatment after washing in order to revitalize the desired effects. For instance, ironing or at least tumble drying at temperatures >80° C. is a prerequisite for good phobic properties.

SUMMARY

A preparation is disclosed which endows flat materials with optimal hydrophobic properties having good wash durability coupled with only minimal harshening and offers commercial advantages compared with prior art FC polymer finishing. At the same time, exemplary preparations can be stable in storage and can, for example, have no emissionable constituents, especially no latently detachable formaldehyde. The preparation can moreover be compatible, under application conditions, with other, prior art preparations, for example FC polymers or the boosters which are frequently employed in conjunction with FC polymers and which are based on blocked polyisocyanates.

The preparation can be capable of wholly or partly regenerating a flat material's declining hydrophobic with or without oleophobic performance after multiple washes when the flat material is aftertreated with the preparation.

DETAILED DESCRIPTION

It has now been found that, surprisingly, the foregoing featuers can be achieved by the use of a preparation which, as well as prior art waxy components of diverse provenance, contain a novel component (2), if appropriate a polyisocyanate blocked by a protecting group and also, in the case of aqueous preparations, essential emulsifiers. The preparations thus obtained can provide superior hydrophobic properties having high durability to washing and waterbased emulsions are free of any tendency to crosslink prematurely and hence of any associated tendency to increase in viscosity. When suitable FC polymers are additionally used in the application liquor it is possible to achieve good oil and soil repellency as well as good hydrophobic properties.

Exemplary embodiments firstly provide preparations (Z) based on water and/or organic solvents, characterized by the inclusion of the following individual components:
(1) 10-90% of a hydrophobic wax based component,
(2) 10-90% of a hydrophobic reaction product (S) obtainable by reacting a component (A) of the

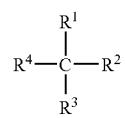

formula (I)

and/or of the formula

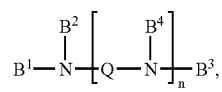

(II)

where $R^1$ is a hydrophobic residue of the meaning -X-Y-Z or -Z, where

X is $-(CH_2)_{n'}-$,

Y is

—O—C—    or    —O—C—NH—,
   ‖               ‖
   O               O

Z is $-(CH_2)_{m'}-CH_3$ or $-CH_2CH_2(CF_2)_m-CF_3$, $R^2$ is a residue of the composition

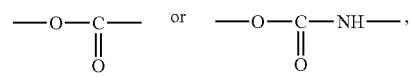

$R^3$ is a hydrophobic residue of the meaning -X-Y-Z, -Z or -Y-Z, with the proviso that in the case of the meaning -Y-Z n" always replaces n in the $R^2$ residue, $R^4$ is a residue of the meaning -X-Y-Z or $-(CH_2)_nH$, $B^1$ is a hydrophobic residue of the meaning -V-W-Z or -Z, where V is $-(CH_2)_{n''}-$ or W is 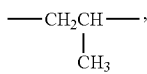

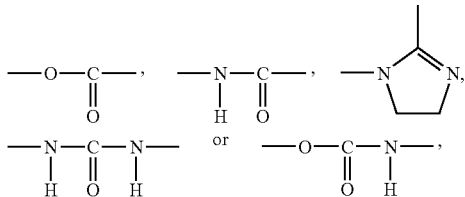

$B^2$ is

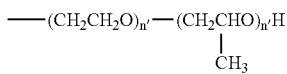

or 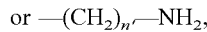, $B^3$ is a hydrophobic residue of the meaning -V-W-Z, -Z or

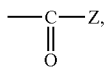

$B^4$ is -V-W-Z or

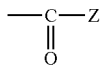

and
Q is —$(CH_2)_{n''}$—,
n, n', n'', m and m' are integers of the meaning
$n=0-2$,
$n'=0-4$,
$n''=1-4$,
$m=3-11$, preferably 5-9, and
$m'=12-26$, preferably 14-22, with a partially blocked or non-blocked di-, tri- or polyisocyanate (IC), wherein the fraction of free NCO groups is between 1.8 and per mole and the ratio of free NCO groups to reactive groups in the compounds of the formulae (I) and/or (II) is in the range from 1:1 to 1:1.3,
(3) 0-45% of a blocked or non-blocked di-, tri- or polyisocyanate, and
(4) if appropriate customary emulsifiers.

All percentages relating to preparations according to exemplary embodiments of the present invention are based on the overall composition of the active substances in the preparation according to the present invention and are by weight. Preferred ranges are 20-80% and more preferably 25-65% for component (1) and 20-80% but especially 30-70% for component (2). When component (3) is added, its concentration is preferably in the range of 1-40% and especially in the range of 5-35%. The preferred concentration of component (4) is in the range of 4-25% and more preferably in the range of 7-15%, based on the sum total of the active substance in the components (1), (2) and (3) used.

Component (1) of the preparation contains or alternately, consists of, a hydrophobic component. This component can be a wax and can consist of the customary, well-known hydrocarbons of diverse provenance. Not only natural waxes, such as beeswax or carnauba wax, but also synthetic waxes such as polyethylene waxes and Fischer-Tropsch waxes can be used. Particular preference, however, can be given to linear paraffinic waxes if appropriate with a 1-5% by weight fraction of short-chain linear hydrocarbons which are liquid at room temperature. Paraffin melting points which are optimal with regard to hydrophobic effects are known from the prior art. Low-melting paraffins having a melting point <50° C. provide distinctly worse hydrophobic values than those having melting points >60° C. Particular preference can be given to paraffin waxes having a melting range of 40-70° C. and especially to those having a melting range of 60-70° C.

Component (2) can contain, or alternately consist of, a hydrophobic reaction product (S) obtainable by reacting a component (A) as defined in the claims with a di-, tri- or polyisocyanate (IC) as defined in the claims. The component (A) compounds of the formula (I) which are used in this component (2) consist of reaction products of polyhydroxy alcohols (a1) with carboxylic acids (b1) or with alkyl isocyanates (b2). Preferred examples of polyhydroxy alcohols (a1) are glycerol, trimethylolethane, trimethylolpropane, 1,2,4-butanetriol, pentaerythritol or sugars, such as glucose for example. Particular preference thereamong is given to glycerol, trimethylolethane, trimethylolpropane, 1,2,4-butanetriol and pentaerythritol.

The component (A) compounds of the formula (II) which are used in component (2) can consist of reaction products of alkanolamines (a2) and/or alkylamines (a3) with carboxylic acids (b1) or with alkyl isocyanates (b2). Examples of alkanolamines (a2) are 2-amino-2,3-propanediol, 2-amino-2-methyl-1,3-propanediol, diethanolamine, dipropanolamine, diisopropanolamine, ethanolpropanolamine, triethanolamine, triisopropanolamine, N,N,N',N'-tetrakis(2-hydroxypropyl)ethylenediamine, aminoethylethanolamine, aminopropylethanolamine, alkyltris(hydroxyethyl)propylenediamine and alkyldihydroxyethylamine having preferably 12-24 carbon atoms in the alkyl moiety, and also ethoxylation products thereof. Of these, diethanolamine, diisopropanolamine, triethanolamine, triisopropanolamine, aminoethylethanolamine and aminopropylethanolamine are particularly preferred.

Examples of alkylamines (a3) are bis(aminoethyl)amine, bis(aminopropyl)amine and their polymeric homologues, aminoethylaminepropylamine, bis(aminopropyl)ethylenediamine, tris(aminoethyl)amine, tris(aminopropyl)amine, trisaminononane, aminopropylstearylamine and aminopropylbisstearylamine. Of these, bis(aminoethyl)amine, bis(aminopropyl)amine, aminoethylaminopropylamine, bis(aminopropyl)ethylenediamine and aminopropylstearylamine are particularly preferred.

In lieu of component (A) prepared using the polyhydroxy alcohols (a1) or the alkanolamines (a2) or the alkylamines (a3) and also the carboxylic acids (b1) of the alkyl isocyanates (b2), the partially blocked or non-blocked di-, tri- or polyisocyanates (IC) can also be reacted with components having an active hydrogen atom and two hydrophobic moieties, such as for example, Guerbet alcohols, bis(dodecyl)amine and preferably bis(octadecyl)amine.

Component (A) may further be prepared as described above using mixtures of the alcohols (a1) mentioned with the alkanolamines (a2) and with the alkylamines (a3).

The carboxylic acids (b1) used for preparing component (A) of the formula (I) and (II) can be saturated, linear or branch chained having 9 to 31 carbon atoms, preferably having 11-23 carbon atoms in the alkyl moiety. Examples of the saturated linear carboxylic acids used in formula (I) and (II) are capric acid, undecanoic acid, lauric acid, myristic acid, palmitic acid, stearic acid, arachidic acid and behenic acid. Of these, lauric acid, palmitic acid, stearic acid and behenic acid are particularly preferred.

Linear perfluorinated carboxylic acids having 6-12 carbon atoms in the perfluorinated alkyl moiety can be used in a specific embodiment when oil and soil repellency is desired on the finished flat materials as well as hydrophobic properties.

The alkyl isocyanates (b2) used for preparing component (A) of the formula (I) and (II) are preferably linear and have 9-31 and especially 12-22 carbon atoms in the alkyl moiety, an example being stearyl isocyanate.

The partially blocked or non-blocked di-, tri- or polyisocyanate (IC) can also be reacted using mixtures of two compounds of the formulae (I) and (II).

If compounds of the formulae (I) and (II) are commercially available, they can be used direct for the reaction mentioned; there is therefore no need to make them separately.

The above-explained component (A) is reacted with the di-, tri- or polyisocyanates (IC) defined in the claims to form a product (S). Examples of di-, tri- or polyisocyanates (IC) used for conversion into partially blocked or non-blocked isocyanates are described in paras 0032 to 0037 inclusive of DE-A-100 17 651.

Particularly preferred di-, tri- or polyisocyanates (IC) are for example 2,4-tolylene diisocyanate, 2,4'-diphenylmethane diisocyanate, 4-methylcyclohexane 1,3-diisocyanate, 4,4'-diphenylmethane diisocyanate, the mixtures of monomeric diphenylmethane diisocyanates and polymeric homologues of diphenylmethane diisocyanates (polymeric MDI), tetramethylene diisocyanate, tetramethylene diisocyanate trimers, hexamethylene diisocyanate, hexamethylene diisocyanate trimers, isophorone diisocyanate, isophorone diisocyanate trimers, 2,2,4- or 2,4,4-trimethyl-1,6-hexamethylene diisocyanate and dimer diisocyanate. Dimer diisocyanate is available from Cognis Corp., 300 Brookside Avenue, Ambler, Pa. 19002, USA, under the designation of DDI 1410.

Cyclized oligo- or polyisocyanates can be prepared by known methods of cyclization as per W. Siefken (Liebigs Annalen der Chemie 562, Volume 1949, pages 75-136), for which open or cyclic oligo- or polyisocyanates can be employed. Such compounds can be prepared from the di-, tri- and polyisocyanates mentioned by linking through urethane, allophanate, urea, biuret, uretdione, amide, isocyanurate, carbodiimide, uretoneimine, oxadiazine-trione or iminooxadiazinedione structures. Preference is given to using hexamethylene diisocyanate trimers, diphenylmethane diisocyanate trimers and urethanes from 2,4-tolylene diisocyanate which still have free NCO groups.

It is also possible to react some of the isocyanate groups with polyalkoxymonoalkyl ethers using appropriate catalyst systems for assistance to form urethanes in order that the emulsifiability of component (2) in water may be improved. Polyethylene glycol monomethyl ethers having 4-20 ethylene oxide units, optionally with additional 2-6 propylene oxide units, may be used. Useful catalysts include the well-known systems based on tertiary amines and/or organotin compounds, for example dibutyltin dilaurate, dioctyltin dilaurate or dioctyltin diacetate.

As an alternative to the isocyanates modified with polyalkoxymonoalkyl ethers it is possible to use tertiary alkanolamines as additives in order that the cationic charge of the reaction products (S) and hence the self-emulsifying properties may be improved without impairing the overall properties. Dimethylaminoethanol is particularly suitable here.

When partially blocked di-, tri- or polyisocyanates (IC) are used for the reaction to form component (2), these may be partially blocked with the customary and known blocking agents, as described for example in para 0042 of DE-A-100 17 651. Preference is given to using sodium bisulphite or methyl ethyl ketoxime, but especially 3,5-dimethylpyrazole to effect partial blocking.

Partial blocking is effected by reacting the di-, tri- or polyisocyanates (IC) to be blocked with the blocking agent in the melt or in a substantially isocyanate-inert organic solvent (LM), preferably under a protective gas atmosphere and in the presence of a suitable catalyst, as described for example in European patent specification EP 0 159 117 B1 or German patent specification DE 44 41 418 A1. The ratio of the free NCO groups of the di-, tri- or polyisocyanates (IC) to be blocked to the reactive groups of the blocking agent is preferably in a stoichiometric excess up to 2:1 and preferably up to 3:1.

As suitable, inert organic solvents (LM) there are preferably anhydrous esters, for example ethyl acetate, n-propyl acetate, i-propyl acetate, n-butyl acetate, i-butyl acetate or amyl acetate.

The addition of component (3) is optional. Compounds of this type are referred to as boosters in that they boost the water repellency of treated flat materials. At the same time, the polyfunctionality of the polyisocyanate brings about a cross-linkage with the —OH, —COOH or —NH$_2$ groups always present in most substrates and with unconverted functions of component (2), and this distinctly improves the durability to washing operations and enhances the resistance to abrasion.

Component (3) can be used in non-blocked form as well as in blocked form. The non-blocked forms of component (3) are predominantly employed in applications from apolar media, since this avoids any unwanted, premature reaction of the free NCO groups with the reactive active hydrogen atoms of the application medium.

The non-blocked di-, tri- or polyisocyanates suitable for preparing component (3) and also the cyclized oligo- and polyisocyanates were described above in relation to the preparation of reaction product (S) in component (2).

When component (3) is to be applied to flat materials from application media which bear active hydrogen atoms, it is frequently necessary to protect the reactive NCO groups by blocking them with suitable blocking agents. In these cases, component (3) is prepared by processes wherein the complete blocking of the free NCO groups of di-, tri- or polyisocyanates is carried out with a blocking agent and optionally in the presence of an organic solvent. To achieve complete blocking, it is customary to employ a small stoichiometric excess of blocking agent. When products for aqueous applications are to be prepared, the blocked di-, tri- or polyisocyanates, which may be dissolved in an organic solvent, have to be converted into emulsion form through use of suitable emulsifiers (=component (4)).

Examples of suitable customary and known blocking agents are known from para 0042 of DE-A-100 17 651 and are described above in the description of the preparation of reaction product (S) in component (2).

There is a particular embodiment where non-blocked di-, tri- or polyisocyanates are used as boosters, but the self-emulsifiability in water of these non-blocked di-, tri- or polyisocyanates is enhanced by partial reaction of the isocyanate groups with polyalkoxymonoalkyl ethers through assistance of appropriate catalyst systems to form urethanes. The attachment of hydrophilic side chains to the di-, tri- or polyisocyanates serves to modify the HLB value of the resultant urethane such that the inherently water-insoluble compound acquires self-emulsifying properties. A certain selection of type and amount is advantageous with regard to the hydrophilic side chains. Preference is given to using between 4 and 20 ethylene oxide moieties, optionally together with 2-6 propylene oxide moieties, and these can also be present in blocks within the alkoxy chain. In the case of such mixedly alkoxylated side chains, however, the ethylene oxide fraction will always outweigh the propylene oxide fraction. Useful catalysts for the urethane synthesis include the well-known systems based on tertiary amines and/or organotin compounds, for example dibutyltin dilaurate, dioctyltin dilaurate or dioctyltin diacetate.

In use, the urethanes thus prepared spontaneously form fine emulsions in water which possess high stability to shearing forces and good compatibility with the other components of an application liquor. Owing to the reactivity of the remaining, unconverted NCO groups with water, these speciality forms allow only limited pot lives of not more than 8 hours in the application liquor.

Component (3) is added especially in cases where the treated flat materials have to meet particularly high wash-stability requirements. It is then preferable to employ 5-25% of this compound, which can be used directly and without formulation auxiliaries when application is to take place from waterless solvent-based media. For application from an aqueous medium, it is preferable to employ emulsions of component (3) which have a solids content of 15-35% and which are prepared by using emulsifiers (=component (4)) based on ethoxylated fatty amines, optionally in quaternary form, and if appropriate other emulsifying auxiliaries, for example solubilizers based on ethylene glycol, propylene glycol, dipropylene glycol, dipropylene glycol monomethyl ether, mono- or diethylene glycol monobutyl ether or N-methylpyrrolidone. Emulsification can be effected by means of high pressure homogenizing machines.

When the preparations (Z) of the present invention are aqueous based, the emulsifiers (=component (4)) are used. The emulsifiers (=component (4)) used for formulating components (1), (2) and if appropriate (3) of the preparations according to the present invention are known. Useful emulsifiers include for example ethoxylation products of fatty acids, fatty acid amides, fatty alcohols, fatty amines, the latter as such or in the form of their salts with low molecular weight organic acids or mineral acids and also quaternary ammonium compounds, for example cetylbenzyldimethylammonium chloride and preferably ethoxylated octadecylmethylammonium chloride. Such emulsifiers are described for example in "Rompp Lexikon Chemie" (10th edition, Volume 2, pages 1149 and 1150).

The customary use levels for the emulsifiers are preferably between 4% and 25% by weight, based on the sum total of the active substance of components (1), (2) and if appropriate (3).

The emulsions are prepared using the known methods of forming secondary emulsions. Typically the emulsifying temperature is above the melting range of the active substances of the employed components (1), (2) and if appropriate (3), and preferably it is between 50 and 80° C. To produce very finely dispersed and particularly stable emulsions, a coarsely dispersed pre-emulsion is frequently prepared first, the particles of which are subsequently comminuted to the necessary average particle size between 0.1 and 10 micrometers by means of high pressure homogenizers.

If desired, the inert organic solvents (LM) added as a reaction medium for preparing the components (2) and if appropriate (3), examples being ethyl acetate, n-propyl acetate, i-propyl acetate, n-butyl acetate, i-butyl acetate or amyl acetate, can be distillatively removed after emulsification in order that emissionable organic hydrocarbons may be avoided.

A further aspect of the invention is the use of the exemplary preparations disclosed herein as a finish on flat materials. Examples of textile flat materials include wovens, formed-loop knits and prebonded nonwovens composed of natural fibres, such as wool or cotton, or synthetic fibres, especially polyester, polyamide and regenerated fibres or blends thereof.

Textile flat materials are generally treated to add-ons of 1-5% by weight and preferably 3-5% by weight of solids of the present invention's preparation based on the weight of the flat materials to be treated. Typically, an aqueous liquor is applied by padding in the desired concentration at wet pick-ups of 40-100%, subsequent predrying at 80-110° C. and a following hot treatment at 130-170° C. for 1-5 minutes. The duration of the heat treatment is in each case dependent on the temperatures employed.

The well-known exhaust process is another possible form of application to textile flat materials.

When used on textile flat materials, the preparations of the present invention can also be combined with textile auxiliaries customary in the textile industry. To be emphasized here are agents which improve the crease recovery, for example methylol compounds of dihydroxyethyleneurea or methylolmelamine ethers having different degrees of methylolation. Useful textile auxiliaries further include those which improve flame resistance or endow the flat materials with a preferred hand. Fabric hand, however, can be steered in the desired direction through favourable combination of components (1) to (3) which is why in these cases there is no need to include further textile auxiliaries.

If the treated flat materials are desired to have oil and soil repellencies as well as good hydrophobic properties, FC polymers can be added to the application liquors as textile auxiliaries.

The flat materials can also consist of paper, which can be produced by the known papermaker's methods and from all basic materials customary in this field of application. The preparations of the present invention can be employed either as an additive to the paper pulp or by application to the surface of the machine-finished paper by coating systems utilizing roll, doctor or air knife coating processes and subsequent infrared, hot air or cylinder drying.

Flat materials composed of leather are likewise suitable for finishing with the preparations of the present invention. Application in the post-tannage finishing operations can take the form of existing processes or by spraying or drenching.

The treatment of other flat materials is likewise possible. For instance, mineral flat materials, examples being unglazed tiles, ceramic parts or else wall surfaces, can be endowed with excellent water repellency by drenching with the finishing liquor of the present invention.

Flat materials can be treated by various methods, for example through application of a liquor of the finish according to the present invention by spraying, padding, brush or sponge application, if appropriate even in foam form. The add-ons used for the preparation of the present invention in terms of solids are generally 1-5% by weight and preferably 3-5% by weight, based on the weight of the flat material to be treated.

A further aspect of the invention is the use of the present invention's preparations on textile substrates as an aftertreatment of washed textiles.

Many made-up articles are washed either in the home on household washing machines or on industrial washing machines. The latter applies particularly to the work wear of firefighters, the police, the military and other professions which frequently have to spend time outdoors and hence are exposed to the weather. The garments, typically finished to be oil, water and soil repellent, undergo a loss of these properties due to washing. These properties are therefore frequently refreshed and revitalized again through an aftertreatment with phobicizing agents. The preparations of the present invention are useful for this purpose.

The revitalizing treatment of industrially washed garments takes place in a washing or spin dryer drum by pouring a liquor of the preparations according to the present invention on the moist spun garments and subsequent tumble drying. In the case of household washing machines, the finish can be applied in the course of the customary rinse cycle or by means of a dosing ball system.

A further aspect of the invention is the use of the preparations according to the present invention as a finish on flat materials from organic solvents by drenching or dipping.

Many garments are not washed, but are subjected to cleaning in organic solvents. As in the case with the aftertreatment of washed articles, the hydrophobic properties can be revitalized by refreshing with products based on the preparations of the present invention.

The revitalizing treatment of garments cleaned in organic solvents takes place in the cleaning drum of a dry cleaning machine by pouring or spraying a liquor of the preparations according to the present invention onto the damp spun cleaned articles and subsequent removal of the solvents in a tumble dryer at elevated temperatures. The chemical identity of the cleaning agent is immaterial here, i.e. the treatment can take place not only on state of the art machines in closed systems using perchloroethylene or on those which are suitable for treatment with solvents based on hydrocarbons, an example being Isopar J.

A further aspect of the invention is the use of the preparations according to the present invention as a finish on flat materials from organic solvents by spraying.

Instead of a revitalizing treatment of textile flat materials after washing or cleaning operations by application of the present invention's preparations from continuous water-based or solvent-based liquors, the present invention's preparations can also be applied by means of various spraying methods in the consumer care sector. Offerings in this sector include phobicizing agents formulated in organic solvents and propellent gases from aerosol cans or through pumping mechanisms. In the shoe care sector in particular an appreciable improvement in water repellency and hence in wear comfort can be achieved.

The examples which follow illustrate the invention. The finishes were applied to textile flat materials on an "RFA" LFV 350/2 laboratory pad-mangle from Benz (Switzerland) with subsequent drying and hot treatment on a TKF 15/M 350 laboratory stenter from Benz (Switzerland). Spray application was carried out in a closed hood through manual and one-sided application by means of a pump spray onto the taut sheetlike structure with subsequent drying at room temperature for 24 hours. The wet pick-up was determined by weighing out the finished test samples before and after application.

The hydrophobic and if appropriate oleophobic effects were tested not directly after application, but only after conditioning of the substrates in a standard atmosphere for 24 hours in order that influences on these properties due to over-drying may be levelled out. Add-on levels and also the conditions for the hot treatment are recited in Tables 3a and 3b together with the phobic effects to be achieved.

The water repellency was tested on the textile flat materials not only by the spray test of AATCC Standard Test Method 22 but also by means of the significantly more discriminating Bundesmann test of German industrial standard DIN 53 888. The test as per AATCC Standard Test Method 22 takes the form of spraying distilled water under controlled conditions onto the textile substrate to be tested and then visually rating the wetting pattern against pictures of an evaluation standard included in the test method. The numerical values reported are based on the appearance of the surface after spraying with water and have the following connotation:

100=No sticking or wetting of upper surface
90=Slight random sticking or wetting of upper surface
80=Wetting of upper surface at spray points
70=Partial wetting of whole of upper surface
50=Complete wetting of whole of upper surface
0=Complete wetting of whole upper and lower surfaces.

In the significantly more discriminatory Bundesmann test of German industrial standard DIN 53 888 the textile substrate to be tested is exposed to the action of a defined artificial shower and the amount of water absorbed after a certain time is determined in percent and identified in Tables 3a and 3b as "water absorption". A further evaluation criterion is the water bead-off effect identified as "bead-off effect" in Tables 3a and 3b. This bead-off effect is rated by visual comparison of the beshowered test samples with the pictures recited in the DIN standard, on a 5-point scale, which is defined as follows:

5=Small droplets bead-off quickly
4=Larger drops form
3=Drops remain sticking at points on the measured sample
2=Measured sample partially surface wetted
1=Measured sample surface wetted or wet through over its entire area.

When FC polymers were included in the application liquors for textile substrates, oil repellency was tested as per AATCC Standard Test Method 118. This test evaluates the ability of the textile substrate to resist wetting by liquid hydrocarbons having different surface tensions. The test yields a rough index of the ability of a substrate to reject oily soils; the higher the rating, the better the repellency of such soils, especially with regard to oily liquids. In the test, droplets of standardized test liquids, consisting of a selected series of hydrocarbons having different surface tensions, are carefully pipetted in succession onto the surface of the specimen to be tested and the wetting after a defined contact time is visually rated. The oil repellency value corresponds to the test liquid having the highest number that causes no wetting of the surface. The standard test liquids have the following composition:

| Oil repellency | Composition |
|---|---|
| 1 = | Nujol |
| 2 = | 65% by volume of Nujol to 35% by volume of n-hexadecane |
| 3 = | n-Hexadecane |
| 4 = | n-Tetradecane |
| 5 = | n-Dodecane |
| 6 = | n-Decane |
| 7 = | n-Octane |
| 8 = | n-Heptane |

State of the art FC polymers are currently achieving oil repellency values of 6; but a rating of 5 is usually already considered excellent.

To test the durability of finished flat materials to washing operations, the test samples were subjected to a 60° C. washing and drying procedure in accordance with EN ISO 6330:2000.

COMPARATIVE EXAMPLE

The comparative emulsion recited in Table 2 (preparation (Z) 1) is prepared as described in Example 1 of German Patent 1 017 133.

Examples Relating to the Preparation of Component (2)

Component (A):

General method of Making Components (A) of Formula (I) and/or (II)

The components indicated in Table 1 (a1, a2 or a3) and (b1) are melted in the amounts indicated in Table 1, which are in grams, in a suitably dimensioned three-neck flask equipped with distillation condenser, adjustable stirrer and internal thermometer under protective gas and with stirring. The mixture is then heated to the end temperature (T) indicated in Table 1 and stirred until water of reaction is no longer distilled off and the acid number (SZ) reported in Table 1 is attained. If necessary, 0.1% of sulphuric acid can be added to the esterification reactions as a catalyst. No addition of catalyst is needed in the case of the amidation reactions. The resulting condensation product is poured out, cooled down and chipped.

Component (A):

Particular Method of Making Components (A) of Formula (I) and/or (II) Involving the Use of Alkyl Isocyanates (b2) and Further Processing to Form Reaction Products (S)

A suitably dimensioned three-neck flask equipped with reflux condenser, adjustable stirrer, internal thermometer and dripping funnel is charged with the Table 1 components (a1) and (b2) in grams in isopropyl acetate solvent (LM). This is followed by the addition of 0.05% (based on the total amount of the components) of 1,4-diazabicyclo(2,2,2)octane catalyst and stirring of the mixture at 80° C. until the NCO band in the IR spectrum has disappeared. To prepare the reaction product (S), the mixture is subsequently mixed with the amounts in grams of component (IC) which are reported in Table 1 and is stirred at 80° C. until the NCO band in the IR spectrum has disappeared.

Reaction products (S) (=component (2)):

General Method of Making Reaction Products (S) from a Component (A) and Partially Blocked or Non-Blocked di-, tri- or polyisocyanates (IC)

A suitably dimensioned three-neck flask equipped with reflux condenser, adjustable stirrer, internal thermometer and dripping funnel is charged with the Table 1 components (A) and the components (IC) in the Table 1 amounts in grams in isopropyl acetate solvent (LM). This is followed by the addition of 0.05% (based on the total amount of the components) of 1,4-diazabicyclo(2,2,2)octane catalyst and stirring of the mixture at 65° C. until the NCO band in the IR spectrum has disappeared.

Particular Method of Making the Reaction Products (S) Used in Emulsions (E) 1 and 2

Emulsions (E) 1 and 2 as per Table 1 are prepared using reaction products (S) prepared by the Table 1 amounts (in grams) of dimethylaminoethanol being added in the course of the reaction of component (A) with the isocyanate (IC).

Emulsions (E):

General Method of Making Emulsions (E) from Component (1) and Component (2) or the Reaction Products (S)

Oily Phase:

A suitably dimensioned glass beaker is charged with the Table 1 amounts (in grams) of reaction product (S), present in the aforementioned isopropyl acetate, and of component (1), and this initial charge is heated to 65-70° C. with stirring until a clear, homogeneous solution has formed. The reaction product (S) to be used may have to be melted at 65-70° C. before use in order that a homogeneous reactant may be obtained.

Aqueous Phase:

The Table 1 amounts (in grams) of emulsifiers (Em) (=component (4)) are dissolved in the stated amount of water at 65° C. in a suitably dimensioned glass beaker.

The two phases are stirred together by a high speed stirrer to form a coarse pre-emulsion and subsequently homogenized at 65° C. on a high pressure homogenizing machine at 300-500 bar until an average particle size between 0.1 and 10 micrometers is reached. The solvent (LM) is subsequently removed by azeotropic distillation under reduced pressure on a rotary evaporator. If appropriate, the pH of the resulting emulsion is adjusted to 5-7 with acetic acid 60%, and the resultant white emulsion is filtered through a 20 micrometre filter and adjusted with water to a solids content of 20%.

Production of Inventive Preparations (Z)

Table 2 emulsions (E), comprising components (1), (2) and (4), are mixed if appropriate with component (3) and if appropriate with water in the stated weight ratios to obtain the preparations (Z) reported in Table 2.

Finishing Examples

Use of Water-Based Preparations (Z) on Textile Fabrics:

Finishing conditions and test results are recited in Tables 3a and 3b.

Use of Solvent-Based Preparations (Z) on Textile Fabrics (not Recited in Tables 3a and 3b):

For this use, 11.5 g (instead of 113.8 g) of the reaction product (S) recited in column 4 of Table 1 are dissolved with 7.5 g of 60/62 paraffin in 231 g of n-heptane. The solution is pump sprayed from about 30 cm against the Table 3a and 3b cotton and polyester substrates until the surfaces are uniformly wetted. The fabrics are subsequently dried at room temperature for 24 hours. The treated cotton poplin test fabrics exhibit an AATCC Standard Test Method 22 water repellency of 90, while the woven polyester test fabrics exhibit an AATCC Standard Test Method 22 water repellency of 100.

TABLE 1

Preparation of component (1) and component (2) and also their emulsions (E)
Amounts reported in grams

| | | | Components | 1 | 2 | 3 | 4 | 5 | 6 | 7 |
|---|---|---|---|---|---|---|---|---|---|---|
| Component (A) (= precursor from (a) and (b) for reaction product (S)) | (a) | (a1) | Glycerol | — | — | — | — | — | — | — |
| | | (a2) | Triethanolamine | — | 85.5 | 85.5 | 85.5 | 85.5 | 85.5 | 85.5 |
| | | (a3) | Aminoethylaminopropylamine | — | — | — | — | — | — | — |
| | | | Bis(aminoethyl)amine | 39 | — | — | — | — | — | — |
| | | | Bis(aminopropyl)amine | — | — | — | — | — | — | — |
| | (b) | (b1) | Lauric acid | — | — | — | — | — | — | — |
| | | | Palmitic acid | — | — | — | — | — | — | — |
| | | | Stearic acid | 214 | 330 | 330 | 330 | — | — | — |
| | | | Behenic acid | — | — | — | — | 395 | 395 | 395 |
| | | (b2) | Stearyl isocyanate | — | — | — | — | — | — | — |
| | | | End temperature (T) in °C. | 165 | 160 | 160 | 165 | 160 | 160 | 160 |
| | | | Acid number (SZ) | <5 | <5 | <5 | <5 | <10 | <5 | <5 |
| Reaction product (S) (= comp. (2)) | | | Component (A) | 177 | 95 | 224 | 153 | 191 | 224 | 191 |
| | | | Bis(octadecyl)amine | — | — | — | — | — | — | — |
| | | | Dimethylaminoethanol | 12.3 | 6.15 | — | — | — | — | — |
| | | Isocyanate (IC) | 2,4-Tolylene diisocyanate/trimethylolpropane urethane with 13.5 wt % NCO | 127 | 63.5 | — | — | 71.7 | — | 71.7 |
| | | | Hexamethylene diisocyanate trimer with 21.7 wt % NCO | — | — | 63.5 | 63.5 | — | 55 | — |
| | | Solvent (LM) | Isopropyl acetate | 385 | 192 | 290 | 192 | 262 | 284 | 262 |
| Emulsion (E) comprising components (1), (2) and (4) | | | Reaction product (S) | 100 | 100 | 167 | 114 | 167 | 167 | 167 |
| | | Component (1) wax | Paraffin 60/62 | 75 | 75 | 32.8 | 83.8 | 32.8 | 32.8 | — |
| | | | Paraffin 52/54 | — | — | — | — | — | — | 32.8 |
| | | | Carnauba wax | — | — | — | — | — | — | — |
| | | Component (4) emulsifier (Em) | Ethoquad HT 25 | 0.16 | 0.16 | 0.47 | 0.47 | 0.47 | 0.47 | 0.47 |
| | | | Disponil A 1080 | 1.77 | 1.77 | 5.3 | 5.3 | 5.3 | 5.3 | 5.3 |
| | | | Arquad 2C75 | 1.33 | 1.33 | 4 | 4 | 4 | 4 | 4 |
| | | | Water | 385 | 385 | 379 | 451 | 379 | 379 | 379 |
| | | | Acetic acid 60% | 1.2 | — | — | — | — | — | — |

| | | | Components | 8 | 9 | 10 | 11 | 12 | 13 | 14 | 15 |
|---|---|---|---|---|---|---|---|---|---|---|---|
| Component (A) (= precursor from (a) and (b) for reaction product (S)) | (a) | (a1) | Glycerol | — | — | 46 | — | — | — | — | 43.2 |
| | | (a2) | Triethanolamine | 85.5 | 85.5 | — | — | — | — | 61.4 | — |
| | | (a3) | Aminoethylaminopropylamine | — | — | — | — | — | — | — | — |
| | | | Bis(aminoethyl)amine | — | — | — | — | 77.3 | — | — | — |
| | | | Bis(aminopropyl)amine | — | — | — | — | — | 57.6 | — | — |
| | (b) | (b1) | Lauric acid | — | — | — | — | 300 | — | 210 | — |
| | | | Palmitic acid | — | — | 256 | — | — | — | — | — |
| | | | Stearic acid | 330 | 330 | — | — | — | — | — | — |
| | | | Behenic acid | — | — | — | — | — | 304 | — | — |
| | | (b2) | Stearyl isocyanate | — | — | — | — | — | — | — | 268.1 |
| | | | End temperature (T) in °C. | 165 | 165 | 195 | — | 160 | 160 | 165 | — |
| | | | Acid number (SZ) | <5 | <5 | <10 | — | <5 | <15 | <10 | — |
| Reaction product (S) (= comp. (2)) | | | Component (A) | 153 | 224 | 192 | — | 136 | 233 | 140 | 311.3* |
| | | | Bis(octadecyl)amine | — | — | — | 120 | — | — | — | — |
| | | | Dimethylaminoethanol | — | — | — | — | — | — | — | — |
| | | Isocyanate (IC) | 2,4-Tolylene diisocyanate/trimethylolpropane urethane with 13.5 wt % NCO | — | — | 96 | 72 | 93.3 | 93.3 | — | 141.1 |
| | | | Hexamethylene diisocyanate trimer with 21.7 wt % NCO | 63.5 | 63.5 | — | — | — | — | 60.3 | — |
| | | Solvent (LM) | Isopropyl acetate | 192 | 290 | 315 | 315 | 229 | 327 | 212 | 452.3 |
| Emulsion (E) comprising components (1), (2) and (4) | | | Reaction product (S) | 167 | 167 | 301 | 286 | 215 | 215 | 180 | 301.6 |
| | | Component (1) wax | Paraffin 60/62 | — | — | 123 | 117 | 92.4 | 92.4 | — | 123 |
| | | | Paraffin 52/54 | 32.8 | 32.8 | — | — | — | — | — | — |
| | | | Carnauba wax | — | — | — | — | — | — | 90 | — |
| | | Component (4) emulsifier (Em) | Ethoquad HT 25 | 0.47 | 0.47 | 1.4 | 1.3 | 1.1 | 1.1 | 2.1 | 1.4 |
| | | | Disponil A 1080 | 5.3 | 5.3 | 15.7 | 14.9 | 12.8 | 12.8 | 14.2 | 15.74 |
| | | | Arquad 2C75 | 4 | 4 | 12.1 | 11.5 | 10.1 | 10.1 | 9.8 | 12.1 |
| | | | Water | 379 | 379 | 908 | 861 | 672 | 672 | 618 | 972 |
| | | | Acetic acid 60% | — | — | — | — | — | — | — | — |

*= intermediate not isolated

TABLE 2

Blend ratios of inventive preparations (Z)

| Parts by weight of emulsion (E) comprising component (1), (2) and (4) | Parts by weight of component (3) RUCO-GUARD EPF 1660 | Parts by weight of water | Preparation (Z) |
|---|---|---|---|
| 100 of comparative example | — | — | 1 |
| 90 of (E) 1 | — | 10 | 2 |
| 90 of (E) 1 | 10 | — | 3 |
| 90 of (E) 2 | — | 10 | 4 |
| 90 of (E) 2 | 10 | — | 5 |
| 90 of (E) 3 | — | 10 | 6 |
| 90 of (E) 3 | 10 | — | 7 |
| 90 of (E) 4 | — | 10 | 8 |
| 90 of (E) 4 | 10 | — | 9 |
| 62 of (E) 4 | 22 | 16 | 10 |
| 85 of (E) 5 | 15 | — | 11 |
| 85 of (E) 6 | 15 | — | 12 |
| 85 of (E) 7 | 15 | — | 13 |
| 85 of (E) 8 | 15 | — | 14 |
| 85 of (E) 9 | 15 | — | 15 |
| 85 of (E) 10 | 15 | — | 16 |
| 85 of (E) 11 | 15 | — | 17 |
| 85 of (E) 12 | 15 | — | 18 |
| 85 of (E) 13 | 15 | — | 19 |
| 85 of (E) 14 | 15 | — | 20 |
| 85 of (E) 15 | 15 | — | 21 |

TABLE 3a

PAD application on 155 g/m² cotton poplin
Test results

| Amount used of preparation (Z): | 130 g/l water |
| Additionally in the case of preparation (Z) 10: | 20 g/l RUCO-GUARD AFX |
| Wet pick-up: | 80% |
| Drying and curing: | 2 minutes at 170° C. |

| | Preparation (Z) as per Tab. 2 | 1 | 2 | 3 | 4 | 5 | 6 | 7 | 8 | 9 | 10 | 11 |
|---|---|---|---|---|---|---|---|---|---|---|---|---|
| Original | AATCC Standard Test Method 22 | 100 | 90 | 90 | 100 | 100 | 80 | 80 | 100 | 100 | 100 | 90 |
| | DIN 53 888 bead-off effect | 2 | 2 | 2 | 2 | 4 | 2 | 2 | 2 | 3 | 5 | 2 |
| | DIN 53 888 water absorption in % | 27 | 32 | 28 | 30 | 19 | 34 | 28 | 36 | 22 | 15 | 26 |
| | AATCC Standard Test Method 118 | 0 | 0 | 0 | 0 | 0 | 0 | 0 | 0 | 0 | 5 | 0 |
| After 3 × 60° C. washes* | AATCC Standard Test Method 22 | 50 | 70 | 70 | 70 | 100 | 70 | 100 | 80 | 90 | 100 | 90 |
| | DIN 53 888 bead-off effect | 1 | 1 | 1 | 1 | 3 | 1 | 2-3 | 1 | 1-2 | 5 | 1 |
| | DIN 53 888 water absorption in % | 56 | 36 | 42 | 36 | 24 | 41 | 21 | 38 | 25 | 17 | 26 |
| | AATCC Standard Test Method 118 | 0 | 0 | 0 | 0 | 0 | 0 | 0 | 0 | 0 | 4 | 0 |

| | Preparation (Z) as per Tab. 2 | 12 | 13 | 14 | 15 | 16 | 17 | 18 | 19 | 20 | 21 |
|---|---|---|---|---|---|---|---|---|---|---|---|
| Original | AATCC Standard Test Method 22 | 90 | 90 | 100 | 100 | 100 | 100 | 90 | 100 | 90 | 100 |
| | DIN 53 888 bead-off effect | 2 | 2 | 2 | 2 | 5 | 4 | 1-2 | 2-3 | 1 | 3 |
| | DIN 53 888 water absorption in % | 29 | 27 | 24 | 24 | 15 | 19 | 26 | 21 | 26 | 21 |
| | AATCC Standard Test Method 118 | 0 | 0 | 0 | 0 | 0 | 0 | 0 | 0 | 0 | 0 |
| After 3 × 60° C. washes* | AATCC Standard Test Method 22 | 80 | 80 | 90 | 90 | 100 | 80 | 80 | 100 | 90 | 100 |
| | DIN 53 888 bead-off effect | 1 | 1 | 1 | 1 | 5 | 2 | 1 | 1-2 | 1 | 2 |
| | DIN 53 888 water absorption in % | 29 | 29 | 28 | 29 | 19 | 34 | 32 | 28 | 25 | 26 |
| | AATCC Standard Test Method 118 | 0 | 0 | 0 | 0 | 0 | 0 | 0 | 0 | 0 | 0 |

*= as per EN ISO 6330:2000

TABLE 3b

PAD application on one-sidedly sanded 125 g/m² polyester fabric
Test results

| Amount used of preparation (Z): | 130 g/l water |
| Additionally in the case of preparation (Z) 10: | 20 g/l RUCO-GUARD AFX |
| Wet pick-up: | 60% |
| Drying and curing: | 2 minutes at 170° C. |

| | Preparation (Z) as per Tab. 2 | 1 | 2 | 3 | 4 | 5 | 6 | 7 | 8 | 9 | 10 | 11 |
|---|---|---|---|---|---|---|---|---|---|---|---|---|
| Original | AATCC Standard Test Method 22 | 90 | 80 | 80 | 100 | 100 | 100 | 100 | 100 | 100 | 100 | 100 |
| | DIN 53 888 bead-off effect | 1 | 1 | 1 | 1-2 | 1-2 | 5 | 4-5 | 3-4 | 5 | 6 | 3-4 |
| | DIN 53 888 water absorption in % | 28 | 32 | 29 | 17 | 16 | 9 | 11 | 17 | 7 | 1 | 14 |
| | AATCC Standard Test Method 118 | 0 | 0 | 0 | 0 | 0 | 0 | 0 | 0 | 0 | 6 | 0 |
| After 3 × 60° C. washes* | AATCC Standard Test Method 22 | 70 | 80 | 80 | 100 | 100 | 100 | 100 | 100 | 100 | 100 | 100 |
| | DIN 53 888 bead-off effect | 1 | 1 | 1 | 1-2 | 2 | 5 | 4 | 3 | 5 | 5 | 3 |
| | DIN 53 888 water absorption in % | 36 | 32 | 36 | 16 | 16 | 3 | 10 | 13 | 5 | 1 | 15 |
| | AATCC Standard Test Method 118 | 0 | 0 | 0 | 0 | 0 | 0 | 0 | 0 | 0 | 5 | 0 |

TABLE 3b-continued

PAD application on one-sidedly sanded 125 g/m² polyester fabric
Test results

| | Preparation (Z) as per Tab. 2 | 12 | 13 | 14 | 15 | 16 | 17 | 18 | 19 | 20 | 21 |
|---|---|---|---|---|---|---|---|---|---|---|---|
| Original | AATCC Standard Test Method 22 | 100 | 100 | 100 | 100 | 100 | 90 | 90 | 100 | 90 | 90 |
| | DIN 53 888 bead-off effect | 3 | 2 | 4-5 | 3 | 5 | 1 | 2 | 3-4 | 2 | 3 |
| | DIN 53 888 water absorption in % | 17 | 19 | 14 | 15 | 12 | 27 | 23 | 15 | 22 | 17 |
| | AATCC Standard Test Method 118 | 0 | 0 | 0 | 0 | 0 | 0 | 0 | 0 | 0 | 0 |
| After 3 × 60° C. washes* | AATCC Standard Test Method 22 | 100 | 100 | 100 | 100 | 100 | 100 | 90 | 100 | 100 | 90 |
| | DIN 53 888 bead-off effect | 1 | 2 | 2-3 | 2-3 | 5 | 3 | 1 | 4 | 2-3 | 2 |
| | DIN 53 888 water absorption in % | 22 | 17 | 14 | 15 | 4 | 17 | 26 | 12 | 18 | 19 |
| | AATCC Standard Test Method 118 | 0 | 0 | 0 | 0 | 0 | 0 | 0 | 0 | 0 | 0 |

*= as per EN ISO 6330:2000

It will be appreciated by those skilled in the art that the present invention can be embodied in other specific forms without departing from the spirit or essential characteristics thereof. The presently disclosed embodiments are therefore considered in all respects to be illustrative and not restricted. The scope of the invention is indicated by the appended claims rather than the foregoing description and all changes that come within the meaning and range and equivalence thereof are intended to be embraced therein.

The invention claimed is:

1. A composition based on water and/or organic solvents, comprising:
 (1) 10-90% of a hydrophobic wax based component,
 (2) 10-90% of a hydrophobic reaction product obtainable by reacting a component (A) of a

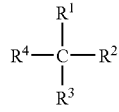

formula (I)

and/or of a formula (II)

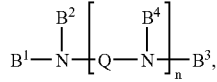

formula (II)

where $R^1$ is a hydrophobic residue of -X-Y-Z or -Z, where
 X is $—(CH_2)_{n''}—$,
 Y is

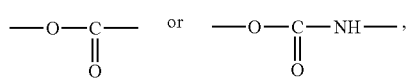

Z is $—(CH_2)_{m'}—CH_3$,
 $R^2$ is a residue of a formula:

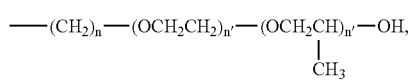

$R^3$ is a hydrophobic residue of -X-Y-Z, -Z or -Y-Z, where in a case when $R^3$ represents -Y-Z, n" always replaces n in the $R^2$ residue,
 $R^4$ is a residue of -X-Y-Z or $—(CH_2)_nH$,
 $B^1$ is a hydrophobic residue of -V-W-Z or -Z, where
 V is $—(CH)_{n''}—$ or $—CH_2CH—$,
    |
    $CH_3$ W is

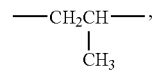

$B^2$ is

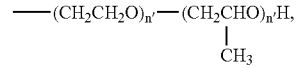

$B^3$ is a hydrophobic residue of -V-W-Z or -Z-C-Z
 $B^4$ is -V-W-Z-C-Z and
 Q is $—(CH_2)_{n''}—$,
 n, n', n" and m' are integers, where:
 n=0-2,
 n'=0-4,
 n"=1-4, and
 m'=12-26,
 with a partially blocked or non-blocked di-, tri- or polyisocyanate wherein a fraction of free NCO groups is between 1.8 and 10 per mole and a ratio of free NCO groups to reactive groups in the component (A) is in a range from 1:1 to to 1:1.3,
 (3) 0-45% of a blocked or non-blocked di-, tri- or polyisocyanate, and
 (4) optionally, an emulsifiers.

2. The composition of claim 1, further comprising a fluorocarbon polymer.

3. A method of forming a finish on flat materials, comprising contacting the composition of claim 1 with a flat material.

4. The method of claim 3, wherein the flat material comprises a textile substrate, a paper, a leather or a mineral flat material.

5. The method of claim 3, wherein the composition is contacted with the flat material by spray application, brush application or sponge application.

6. The method of claim 3, wherein the composition is contacted with the flat material by drenching or dipping or by spray methods.

7. The method of claim 4, wherein the composition is contacted with a textile substrate by PAD application or by an exhaust method.

8. The method of claim 4, wherein the composition is contacted with a textile substrate by an aftertreatment of a washed textile.

9. A method of forming a finish on flat materials, comprising contacting the composition of claim 1 and a fluorocarbon polymer with a flat material in amounts effective to impart oil-repellent characteristics to the flat material.

* * * * *